United States Patent
Deming et al.

(10) Patent No.: US 9,102,286 B1
(45) Date of Patent: Aug. 11, 2015

(54) TRAILER HITCH RECEIVER MOUNTED COLLAPSIBLE WORKBENCH

(71) Applicant: DD Custom Industries, LLC, Orangevale, CA (US)

(72) Inventors: Von Deming, Roseville, CA (US); Brent Deming, Orangevale, CA (US)

(73) Assignee: DD Custom Industries, LLC, Orangevale, CA (US)

( * ) Notice: Subject to any disclaimer, the term of this patent is extended or adjusted under 35 U.S.C. 154(b) by 0 days.

(21) Appl. No.: 14/172,265

(22) Filed: Feb. 4, 2014

(51) Int. Cl.
  *B60R 9/00* (2006.01)
  *B60R 11/00* (2006.01)
  *B60R 11/06* (2006.01)
  *B60R 9/06* (2006.01)

(52) U.S. Cl.
  CPC . *B60R 11/06* (2013.01); *B60R 9/06* (2013.01); *B60R 2011/0061* (2013.01); *B60R 2011/0082* (2013.01)

(58) Field of Classification Search
  CPC ............... B60R 9/06; B60R 9/10; B62J 11/00
  USPC ......... 224/519, 502, 504, 505, 506, 518, 523, 224/524, 525, 529, 530, 531, 499, 924; 414/462; 280/506, 495; 108/44, 115
  See application file for complete search history.

(56) References Cited

U.S. PATENT DOCUMENTS

| | | | | |
|---|---|---|---|---|
| 5,181,822 A * | 1/1993 | Allsop et al. | | 414/462 |
| 5,527,146 A * | 6/1996 | Allsop et al. | | 414/462 |
| 5,529,231 A * | 6/1996 | Burgess | | 224/502 |
| 5,658,119 A * | 8/1997 | Allsop et al. | | 414/462 |
| 5,685,686 A * | 11/1997 | Burns | | 414/462 |
| 5,730,345 A * | 3/1998 | Yeckley et al. | | 224/505 |
| 6,401,999 B1 * | 6/2002 | Hehr | | 224/502 |
| 7,267,253 B2 * | 9/2007 | McCoy et al. | | 224/509 |
| 7,832,607 B2 * | 11/2010 | Clausen et al. | | 224/506 |
| 8,657,167 B2 * | 2/2014 | Horyna et al. | | 224/519 |
| 2002/0050502 A1 * | 5/2002 | Jeong | | 224/506 |
| 2004/0222262 A1 * | 11/2004 | McCoy et al. | | 224/546 |
| 2013/0264367 A1 * | 10/2013 | Hill | | 224/413 |

* cited by examiner

*Primary Examiner* — Justin Larson
*Assistant Examiner* — Lester L Vanterpool
(74) *Attorney, Agent, or Firm* — Craig A. Simmermon (57) ABSTRACT

A workbench assembly that may be reversibly mounted to a trailer hitch receiver of a vehicle with a stabilizer assembly that is also reversibly mounted to the trailer hitch receiver that functions to hold workbench assembly stable and free from motion relative to the trailer hitch receiver. Workbench assembly is collapsible or foldable so that it may be collapsed and folded tightly against the back of the vehicle during vehicle travel and unfolded or extended backwards from the vehicle during use of the workbench. Workbench may have rounded edges for clamping thereto by special clamps. Workbench may have one or more locking groove in its surfaces for locking or clamping thereto by special clamps. When not in use, workbench assembly may stored or mounted on the shop wall by detaching it from the trailer hitch receiver on the vehicle and remounting to a special wall mount assembly attached to the wall.

3 Claims, 9 Drawing Sheets

TRAILER HITCH RECEIVER MOUNTED COLLAPSIBLE WORKBENCH

BACKGROUND OF THE INVENTION

1. Field of the Invention

The present invention relates to a workbench assembly, and, in particular, to a collapsible workbench assembly capable of being mounted to a trailer hitch receiver on any vehicle including pickup trucks.

The rear of a vehicle or tailgate of a pickup truck has long been found to be useful as a workstation. The present invention greatly improves on the usefulness of this workstation by providing a collapsible workbench capable of being mounted inside a trailer hitch receiver on a vehicle where the collapsible workbench may be folded upwards during vehicle transport and folded downwards when the vehicle is at rest to form a workstation with a wide workbench with tracking and locking groves used for mounting a wide array of mechanical such as a vise or similar and a wide array of power tools such as a chop saw or similar.

2. Description of Related Art

There are many tailgate workbenches or workbenches that are attachable to the rear of a pickup truck in the prior art. However, there are no tailgate receiver mounted workbenches in the prior art and certainly none that include the structure described below.

BRIEF SUMMARY OF THE INVENTION

It is an aspect of trailer hitch receiver mounted collapsible workbench to comprise a workbench with a support framework that is reversibly attachable to a trailer hitch receiver on a vehicle. It is an aspect of this reversible attachment to function in the same way that a standard hitch ball mount or a standard hitch ball tongue is reversibly attached to a standard trailer hitch receiver on a vehicle where a tongue is inserted into the trailer hitch receiver on a vehicle and held inside trailer hitch receiver with a hitch pin or alternatively locked inside trailer hitch receiver with hitch lock pin.

It is an aspect of workbench to have a special cross-sectional shape so that the edges, upper surface, and/or lower surface of workbench function in conjunction with commercially available clamping systems and/or individual clamps to provide a workbench or platform to conveniently and securely clamp power tools, mechanical tools, and/or work objects that are fitted with the commercially available clamping systems and/or individual clamps.

It is an aspect of trailer hitch receiver mounted collapsible workbench to further comprise a stabilizer assembly that is rigidly reversibly attachable to the trailer hitch receiver on a vehicle, stabilizer assembly being a rigid framework that includes at least two support channels that receive, support, and rigidly hold the support framework of workbench stationary and appreciably vibrationless relative to the trailer hitch receiver during transport and use of trailer hitch receiver mounted collapsible workbench.

It is an aspect of the support framework of workbench to have a lower articulation point and an upper articulation point, each being an articulation point in the support framework with an axis of rotation that is parallel to the longitudinal axis of the workbench, lower articulation point allowing the workbench to be rotated downward to reduce the height of the workbench and/or rotated upwards to increase the height of the workbench, and upper articulation point allowing the workbench to be rotated into a horizontal and level position at any height or degree of rotation of the lower articulation.

It is an aspect of a lower articulation point to have a designated location and lock mechanism to retain or hold workbench in a reduced height location.

It is an aspect of a lower articulation point to have a designated location and lock mechanism to retain or hold workbench in an increased height location.

It is an aspect of an upper articulation point to have a designated location and lock mechanism to retain or hold workbench level and horizontal at the reduced height location.

It is an aspect of an upper articulation point to have a designated location and lock mechanism to retain or hold workbench level and horizontal at the increased height location.

It is an aspect of trailer hitch receiver mounted collapsible workbench to further comprise a wall mount assembly that is a frame structure that provides wall mounting capability of power tools, mechanical tools, and/or work objects fitted with the commercially available clamping systems and/or individual clamps that function in conjunction with the work bench.

BRIEF DESCRIPTION OF THE DRAWINGS

FIG. 3 further depicts a chop saw locked onto the bench plate of trailer hitch receiver mounted collapsible workbench.

FIG. 8 is a perspective view of a wall mount assembly attached to a wall with a chop saw clamped to the wall mount assembly. FIG. 8 also depicts a collapsible workbench assembly mounted to the wall mount assembly.

DEFINITION LIST

| Term | Definition |
| --- | --- |
| 50 | Trailer Hitch Receiver Mounted Collapsible Workbench |

-continued

DEFINITION LIST

| Term | Definition |
| --- | --- |
| 100 | Stabilizer Assembly |
| 111 | Trailer Hitch Receiver on Vehicle |
| 112 | Horseshoe Plate |
| 112A | Void in Horseshoe Plate |
| 113 | Support Channel |
| 114 | U-Bolt |
| 115 | U-Bolt Attachment Hole |
| 116 | U-Bolt Nut/Washer Set |
| 117 | Upper Safety Chain Mounting Hole |
| 118 | Lower Safety Chain Mounting Hole |
| 119 | Safety Chain Mounting Bolt/Washer Set |
| 120 | Safety Chain Mounting Nut/Washer Set |
| 200 | Collapsible Workbench Assembly |
| 210 | Bench Plate |
| 212 | Main Slab |
| 213 | Air Groove |
| 214 | Upper Locking Groove |
| 215 | Lower Locking Groove |
| 216 | Lower Rib Protrusion |
| 217 | Lower Rail Protrusion |
| 218 | Assembly Screw Hole |
| 220 | Bench Plate Bracket |
| 222 | Assembly Screw |
| 224 | Locking Pin |
| 226 | Lock Tumbler Assembly |
| 228 | Key |
| 230 | Paddle Arm |
| 232 | Upper Pushpin Lock Mounting Hole |
| 234 | Upper Pushpin Lock |
| 236 | Upper Axle Bushing Mounting Hole |
| 238 | Upper Screw Clamp Clearance Slot |
| 240 | Main Arm |
| 241 | Upper Axle Bushing Mounting Hole |
| 242 | Upper Pushpin Lock Clearance Hole Collapsed Position |
| 243 | Upper Pushpin Lock Clearance Hole Work Position |
| 244 | Upper Screw Clamp Mounting Hole |
| 245 | Upper Screw Clamp |
| 246 | Lower Axle Bushing Mounting Hole |
| 247 | Lower Pushpin Lock Mounting Hole |
| 248 | Lower Pushpin Lock |
| 249 | Lower Screw Clamp Clearance Slot |
| 251 | Upper Axle |
| 252 | Upper Axle Bushing |
| 253 | Lower Axle |
| 254 | Lower Axle Bushing |
| 255 | Collar Lock |
| 270 | T-Bar Assembly |
| 272 | T-Frame |
| 272A | Lock Pin Clearance Hole |
| 273 | Ear Plate |
| 274 | Lower Axle Bushing Mounting Hole |
| 275 | Lower Pushpin Clearance Hole Collapsed Position |
| 276 | Lower Pushpin Lock Clearance Hole Work Position |
| 277 | Lower Screw Clamp Mounting Hole |
| 278 | Lower Screw Clamp |
| 300 | Wall Mount Assembly |
| 310 | Wall Frame |
| 320 | Wall Receiver |
| 330 | Wall Plate |

DETAILED DESCRIPTION OF THE INVENTION

Trailer hitch receiver mounted collapsible workbench 50 comprises a stabilizer assembly 100 and a collapsible workbench assembly 200. Collapsible workbench assembly 200 is reversibly mounted in any standard trailer hitch receiver 111 of any vehicle. Collapsible workbench assembly 200 is reversibly mounted inside trailer hitch receiver 111 in the same way that a standard hitch ball mount (not depicted) or a standard hitch ball tongue (not depicted) is reversibly mounted to any standard trailer hitch receiver 111. Trailer hitch receiver 111 is not a component of this invention. Collapsible workbench assembly 200 is held inside trailer hitch receiver 111 with a hitch pin (not depicted) or alternatively locked inside trailer hitch receiver 111 with hitch lock pin (not depicted) where a tongue is inserted into the trailer hitch receiver on a vehicle and held inside trailer hitch receiver with a hitch pin or alternatively locked inside trailer hitch receiver with hitch lock pin.

The hitch pin connection mechanism or the hitch lock pin connection mechanism between collapsible workbench assembly 200 and trailer hitch receiver 111 is not a solid and vibration free connection. To remedy this, stabilizer assembly 100 is used to help provide a more rigid, sturdy, and vibration-free reversible attachment of collapsible workbench assembly 200 to the vehicle. As stated in more detail below, stabilizer assembly 100 is reversibly mounted to the outside of trailer hitch receiver 111 and is used to effectively clamp and hold collapsible workbench assembly 200 steady, horizontal, and free from vibrations relative to trailer hitch receiver 111 during transport and during use of trailer hitch receiver mounted collapsible workbench 50.

Figure 6:
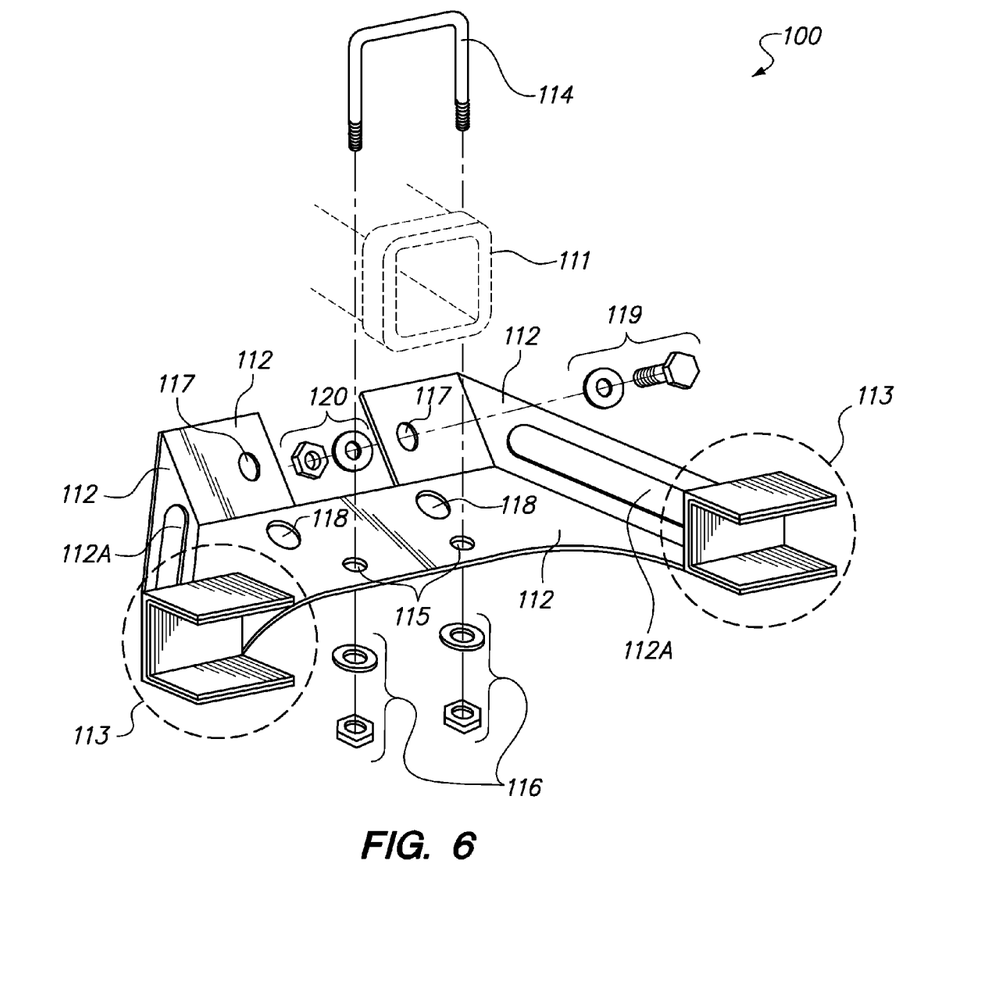
FIG. 6 is an exploded view of stabilizer assembly.

Stabilizer assembly 100 comprises a horseshoe plate 112 and at least two support channels 113. Horseshoe plate 112 is essentially an elongated annulus shape with a notch removed from one end to yield an arced-shaped member with two elongated ends. Horseshoe plate 112 may consist of one overall plate or of several subcomponent plates connected or attached together to form a general horseshoe shaped rigid member. In best mode, as depicted, horseshoe plate 112 consists of several subcomponent plates connected together to form a general horseshoe shape. In best mode, horseshoe plate 112 further comprises a plurality of voids or drilled out areas 112A located therein at strategic positions in horseshoe plate 112 that function to reduce the weight of horseshoe plate 112 without affecting strength or rigidity of the horseshoe plate 112. In best mode, two of the plurality of voids 112A also may function as attachment holes to secure the safety chains from a trailer (not depicted) to the stabilizer assembly 100, which is securely attached to the vehicle as described below, in order to properly attach and tow a trailer with the vehicle without removing the stabilizer assembly 100 from the vehicle. However, as described below, collapsible workbench assembly 200 must be removed from the vehicle in order to properly attach and tow a trailer.

Stabilizer assembly 100 further comprises a trailer hitch receiver attachment means. In best mode, trailer hitch attachment means comprises a U-bolt 114, two U-bolt attachment holes 115, two U-bolt nut/washer sets 116, two upper safety chain mounting holes 117, two lower safety chain mounting holes 118, two safety chain mounting bolt/washer sets 119, and two safety chain mounting nut/washer sets 120. Each of two U-bolt attachment holes 115 is a cylindrical-shaped void or hole in horseshoe plate 112 with its longitudinal axis perpendicular to the arc of the horseshoe shape, each positioned symmetrically across the longitudinal axis of the horseshoe shape, and adjacent to the concave-side of the arc of the horseshoe shape. Each of two lower safety chain mounting holes 117 is a cylindrical-shaped void or hole in horseshoe plate 112 with longitudinal axis perpendicular to the arc of the horseshoe shape, each positioned symmetrically across the longitudinal axis of the horseshoe shape, and adjacent to the convex-side of the arc of the horseshoe shape. Each of two upper safety chain mounting holes 118 is a cylindrical-shaped void or hole in horseshoe plate 112 with longitudinal axis perpendicular to the arc of the horseshoe shape, each positioned symmetrically across the longitudinal axis of the horseshoe shape, and in between upper safety chain mounting holes 117 and U-bolt attachment holes 115.

Figure 5:
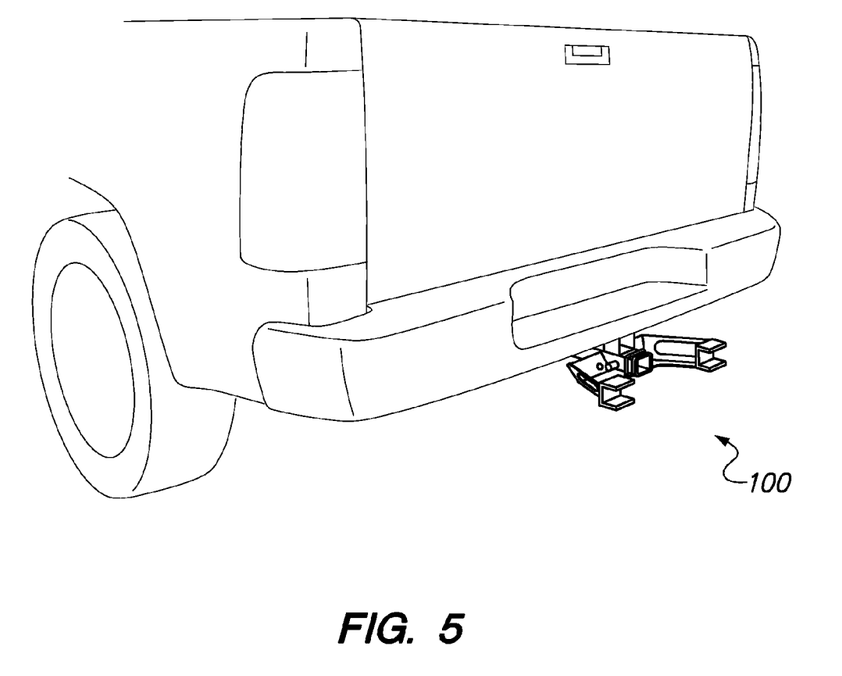
FIG. 5 is a perspective view of stabilizer assembly mounted to the trailer hitch receiver on a pickup truck, without the collapsible workbench assembly mounted thereto.

Stabilizer assembly 100 must be attached to the vehicle prior to attaching the collapsible workbench assembly 200 to the vehicle. Stabilizer assembly 100 is attached or installed on a vehicle with trailer hitch receiver attachment means which is a means to firmly reversibly attach and secure horseshoe plate 112 to the exterior of trailer hitch receiver 111. Trailer hitch receiver is a part of the vehicle that is rigidly attached to the frame of the vehicle. In best mode, as depicted, horseshoe plate 112 is attached to the lower surface of trailer hitch receiver 111 using a U-bolt 114 that is positioned to run over the top of trailer hitch receiver 111, through two U-bolt attachment holes 115 in horseshoe plate 112, with U-bolt nuts and washers 116 used to tighten and fasten U-bolt 114 horseshoe plate 112 firmly against the lower surface of trailer hitch receiver 111. Best mode attachment further includes two safety chain mounting bolt/washer sets 119, each safety chain mounting bolt 119 passing through either an upper safety chain mounting hole 117 or a lower safety chain mounting hole 118, through a safety chain attachment hook on the vehicle's trailer hitch, and threaded into a safety chain mounting nut/washer set 120. Safety chain mounting bolt/washer sets 119 and safety chain mounting nut/washer sets 120 are used to tighten horseshoe plate 112 firmly against the lower surface of trailer hitch receiver 111 to help attach and secure stabilizer assembly 100 to the vehicle. A choice of upper 117 or lower 118 safety chain mounting holes is required to fit the varying locations of safety chain attachment hooks on various types of trailer hitches on various types vehicles. Safety chain attachment hooks (not depicted) are normally used to attach and secure the safety chains from a trailer to the trailer hitch on the vehicle to provide a safety mechanism to catch and hold the trailer to the vehicle in the event of a failure of the primary trailer attachment mechanism. Of course with this invention attached to a vehicle, the vehicle cannot tow a trailer, so this invention can use the safety chain attachment hooks (not depicted) on the vehicle's trailer hitch to help attach and secure horseshoe plate 112 to the exterior of trailer hitch receiver 111. Applicant has taken advantage of these existing two hook locations on every trailer hitch to provide two additional clamping points to help yield a strong vibration-free attachment of horseshoe plate 112 to trailer hitch receiver 111, thus providing strong vibration-free attachment of stabilizer assembly 100 to the vehicle. Although only one safety chain mounting bolt/washer set 119 is depicted in the drawings, two of such sets are required to complete best mode attachment as described above. Although only one safety chain mounting nut/washer set 120 is depicted in the drawings, two of such sets are required to complete best mode attachment as described above.

As stated, horseshoe plate 112 must be very firmly attached to trailer hitch receiver 111 to eliminate all movement and vibrations between these members that may result from transport or use of trailer hitch receiver mounted collapsible workbench 50. In addition to the best mode attachment described above, stabilizer assembly 100 may be attached to the upper surface of trailer hitch receiver 111, a side surface of trailer hitch receiver 111, or any combination thereof. Any known means of attachment may be used for trailer hitch receiver attachment means, including welding, soldering, gluing, bolting, or screwing. Best mode means described above is a specific type of attachment by bolting.

One support channel 113 is rigidly attached to each elongated end of horseshoe plate 112. Each support channel 113 is a rigid three-sided trough or channel with two open ends and an open top. Support channel 113 is sized to form an exact slip fit over the exterior of T-Frame 272. Thus, the inner dimension or width of support channel 113 is an exact dimension that allows just enough clearance for support channel 113 to slide over the outside of T-Frame 272 to form a slip-fit between these members, but not too much clearance to allow any appreciable play, movement, or vibrations between support channel 113 and T-Frame 272. Likewise, the depth of support channel 113 is sized to allow T-Frame 272 to sit securely within support channel 113 without the possibility of T-Frame 272 falling out of support channel 113 resulting from movement or vibrations caused by travel or use of trailer hitch receiver mounted collapsible workbench 50. This slip vibrationless exact slip fit is crucial to the proper functioning of this invention. As stated below, the upper horizontal member of T-Frame 272 may be of any particular exterior shape and where support channel 113 must be similarly shaped, but slightly larger, to form the exact slip fit with upper horizontal member of T-Frame 272. As stated below, in best mode, horizontal member of T-Frame 272 is rectangular cuboid shaped, and thus, best mode support channel 113 is C-shaped.

Each support channel 113 is positioned with open ends of the channel on axis with each other and tangent to each elongated horseshoe plate 112. The bottom of each channel on each support channel 113 is attached to and adjacent to an elongated end of horseshoe plate 112. Thus, each open top of each support channel is in alignment with the longitudinal axis of elongated end of the horseshoe shape there attached.

Horseshoe plate 112 must be attached to trailer hitch receiver 111 in an exact position so that the above described channel axis of open ends is exactly horizontal and in alignment with the vehicles horizontal axis. In best mode, the above described channel axis of open ends is also in the same plane as the longitudinal axis of trailer hitch receiver 111. The horizontal alignment intersecting the longitudinal axis of trailer hitch receiver 111 helps hold and stabilize bench plate 210 in a horizontal position, which is required for a proper workbench operation and transport.

Figure 1:
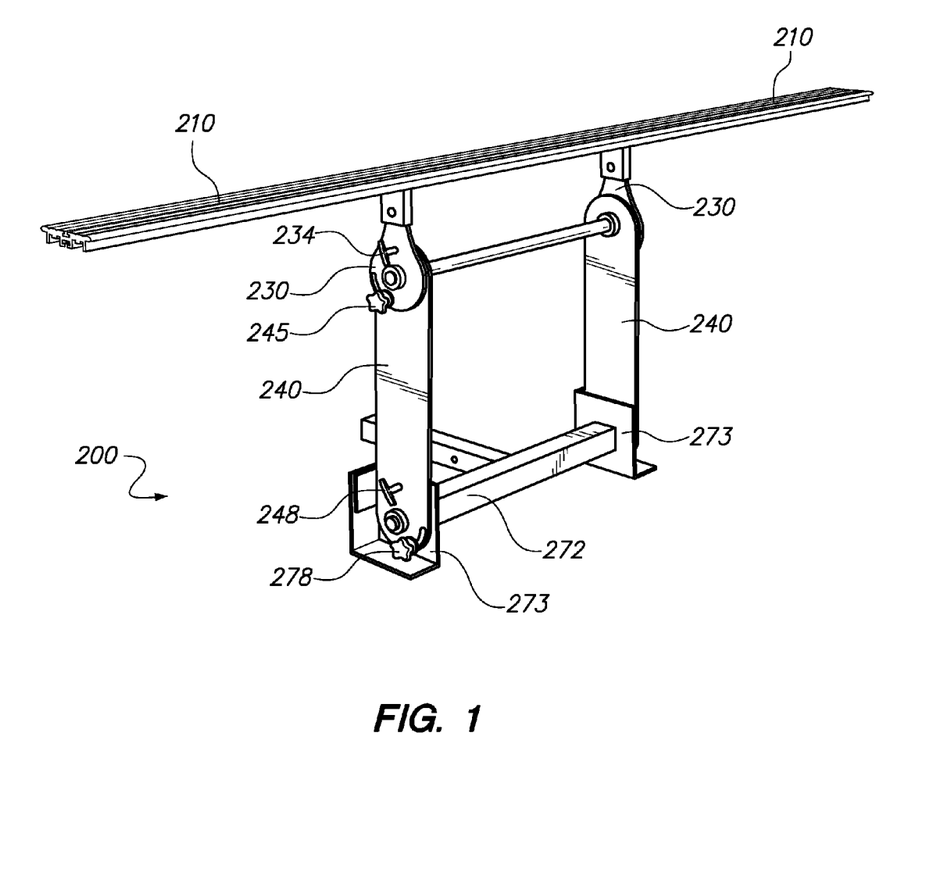
FIG. 1 is a perspective view of collapsible workbench assembly.
Figure 7:
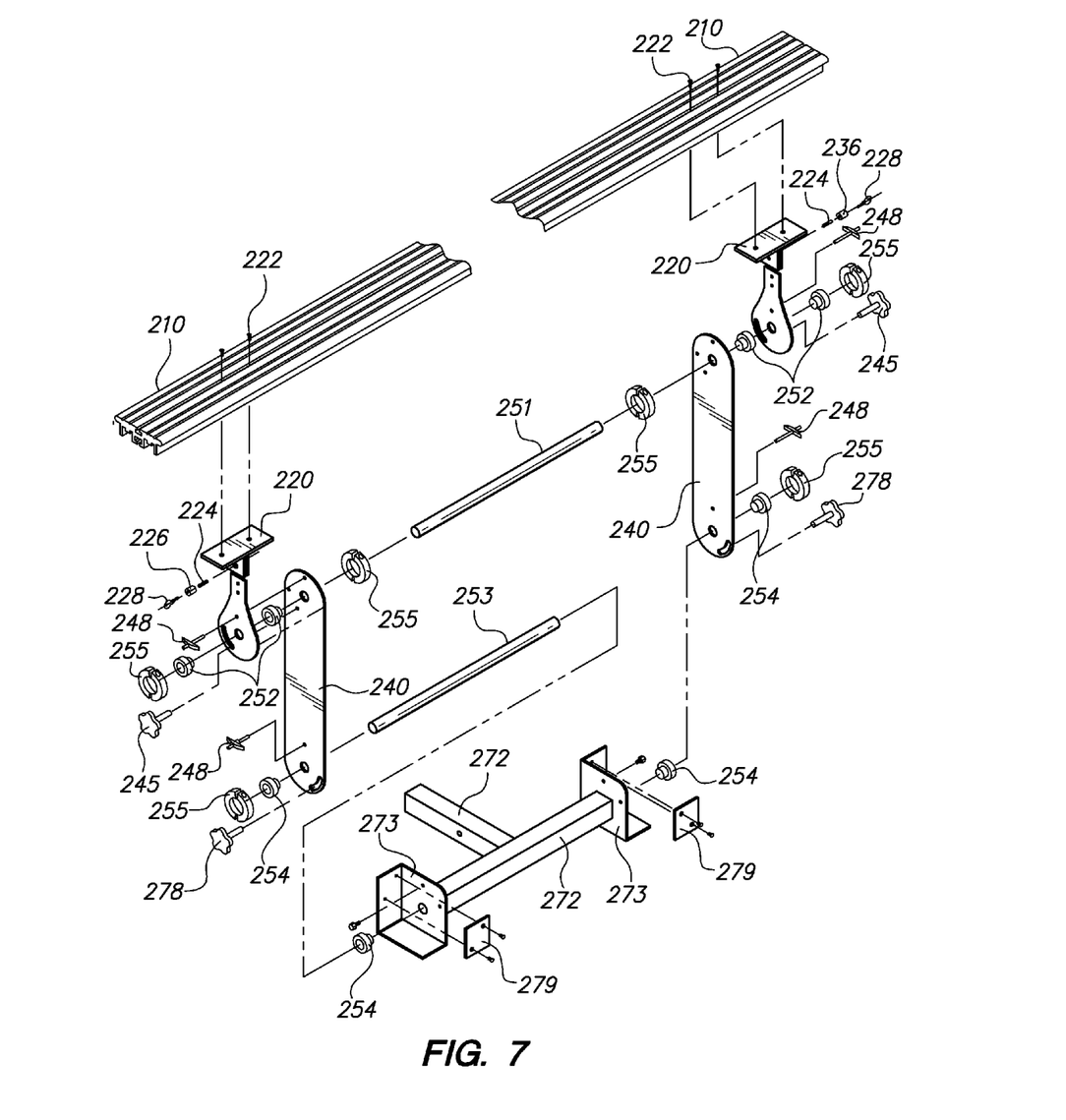
FIG. 7 is an exploded view of collapsible workbench assembly.

Collapsible workbench assembly 200 comprises: a bench plate 210, at least two bench plate brackets 220, at least two paddle arms 230, at least two main arms 240, and a T-Bar assembly 270. Bench plate 210 comprises a main slab 212 that is a rigid planar member in the shape of a slab, plank, or shelve that is itself the workbench component of the invention. Main slab 212 is a strong rigid member that does not flex or deflect to any appreciable degree as a result of the usual pressures applied to a workbench. Main slab 212 is a rectangular cuboid with a length that is about 3-10 feet, a width of about 3-25 inches, and a height of about 0.25-5 inches. Main slab 212 is mounted horizontally across the rear of the vehicle as depicted. Ideally, the length of main slab 212 is no more than the width of the vehicle for safety purposes. Main slab 212 comprises an upper surface, which is the primary work surface of the invention, and a lower surface, which is a secondary work surface of the invention. Bench plate 210 further comprises a plurality of assembly screw holes 218. Assembly screw holes 218 are voids or holes through main slab 212 perpendicular to the upper and lower surfaces that are used to help attach bench plate brackets 220 to the bottom surface of bench plate 210 as described below. Assembly screw holes 218 may be tapped holes.

Figure 3:
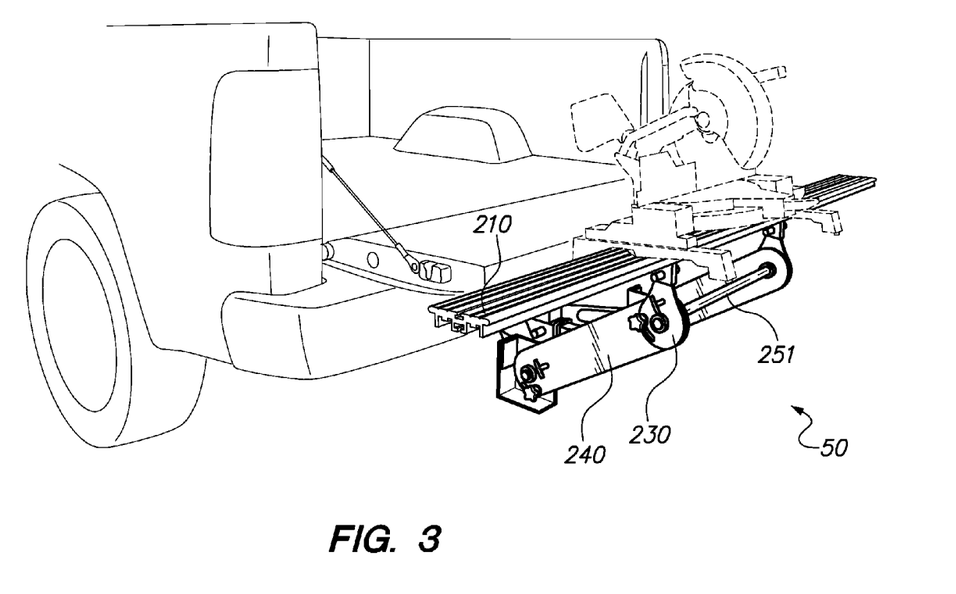
FIG. 3 is a is a perspective view of trailer hitch receiver mounted collapsible workbench mounted to a trailer hitch receiver on a pickup truck with the trailer hitch receiver mounted collapsible workbench in the angled or work position and the tailgate of the pickup truck lowered.
Figure 4:
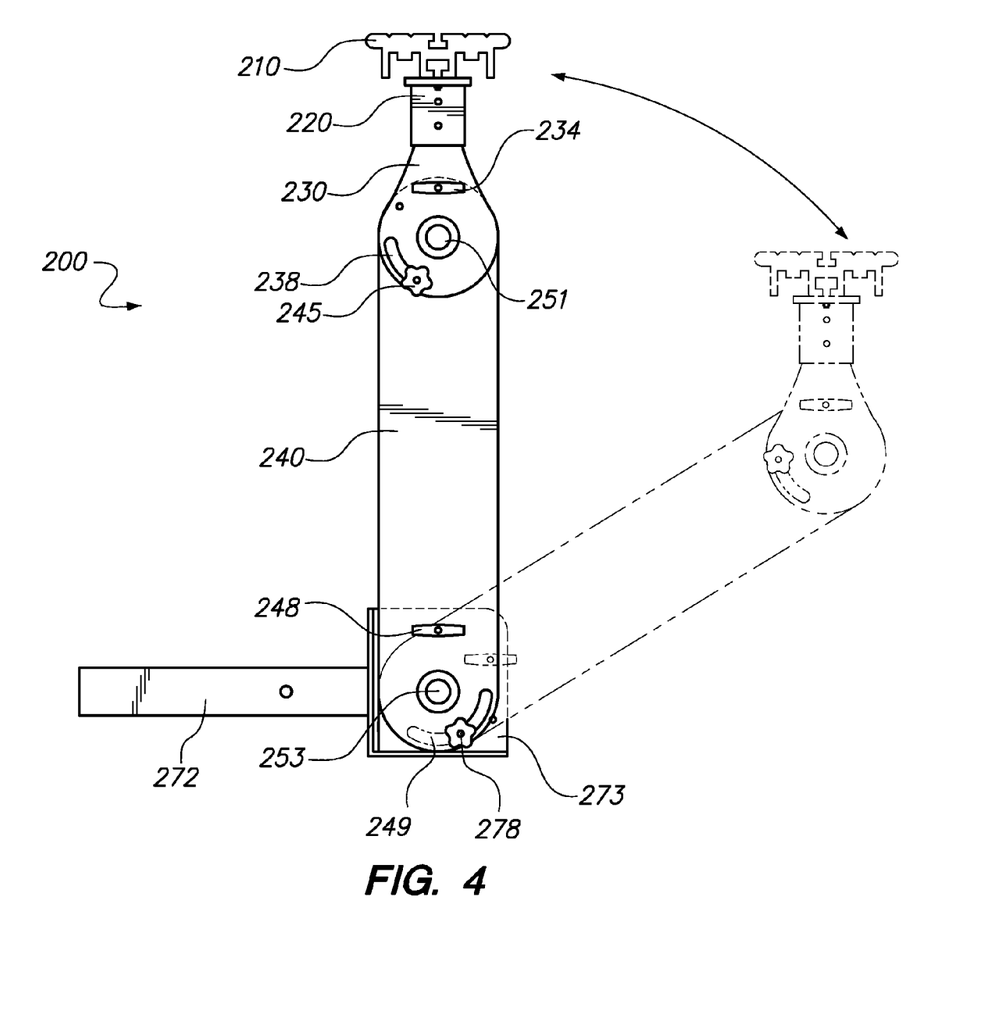
FIG. 4 is a side elevation view of collapsible workbench assembly.

Main slab 212 further comprises rounded edges at its width that run the full length of slab 212. Each rounded edge provides a track or clamping edge that may be used in conjunction with commercially available clamping systems and/or individual clamps. Such commercially available clamping systems and/or individual clamps can provide the ability to clamp power tools, mechanical tools, or work objects to the upper surface of main slab 212 in such a way as to allow convenient adjustability or movement along the length of main slab 212 while holding the subjects fixed in all other dimensions and the convenient locking into position at the desired location along the length of main slab 212. This is a very important aspect of the invention. FIG. 3 depicts a chop saw connected to main slab 212 in this way. Also, rounded edges provide a track or clamping edge that may be used in conjunction with specially made tie-down devices such as that shown in FIG. 9 where two special slideable edge tie-down brackets are depicted that allow convenient adjustability along the length of main slab 212 and convenient locking into the desired postilion.

Figure 10:
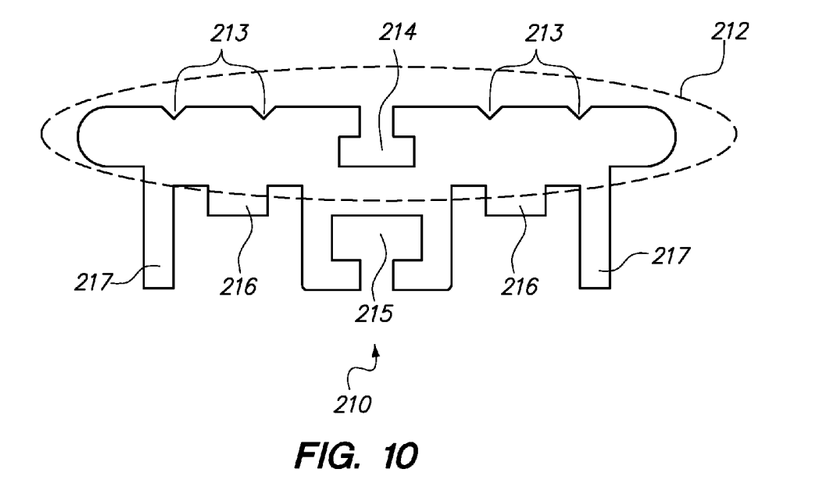
FIG. 10 is a cross-sectional view of best mode bench plate 210 taken at a plane perpendicular to its longitudinal axis.

In best mode, as depicted, bench plate further comprises a plurality of air grooves 213. Each air groove 213 is a longitudinal groove or indentation running across the upper surface of bench plate 212. Each air groove 213 functions to facilitate easier sliding of work pieces or objects across the upper surface of bench plate 212. As work pieces or objects are slid over the upper surface of bench plate 212, air remains in each air groove 213, which acts to reduce friction between the work piece or object and the upper surface of bench plate 213, thereby making it easier to slide objects there across. In best mode, as depicted, there are four air groves 213.

In best mode, as depicted, bench plate further comprises an upper locking groove 214. Upper locking groove 214 is a specially shaped longitudinal groove in the upper surface of main slab 212 running completely across the length of main slab 212. Upper locking groove 214 has a wide lower section and a narrow upper section as depicted. Thus, the bottom of upper locking groove 214 has a wider channel than that of the top, with a step or shoulder separating narrow upper channel from wide lower channel as depicted. This shape is such that a screw may be slid into the locking groove from either side of main slab 212 with the screw head in the wider lower channel to any position along the length of main slab 212 where the screw is remains attached and perpendicular to main slab 212 because the wide bottom of upper locking groove 214 is wide enough and tall enough to provide a clearance fit for the screw head but the narrow upper channel of the locking groove does not provide clearance for the screw head, so the screw is retained in the locking groove during all movement of the screw across the full length of main slab 212. Upper locking groove 214 may be used in conjunction with many types of commercially available clamping systems and/or individual clamps.

In best mode, as depicted, bench plate further comprises and a lower locking groove 215. Lower locking groove 215 is a specially shaped longitudinal groove in the lower surface of main slab 212 running completely across the length of main slab 212. Lower locking groove 215 has a wide upper section and a narrow lower section as depicted. Thus, the top of lower locking groove 215 has a wider channel than that of the bottom, with a step or shoulder separating wide upper channel from narrow lower channel as depicted. This shape is such that a screw may be slid into the locking groove from either side of main slab 212 with the screw head in the wider upper channel to any position along the length of main slab 212 where the screw is remains attached and perpendicular to main slab 212 because the wide upper of each locking groove is wide enough and tall enough to provide clearance fit for the screw head but the narrow lower channel of each locking groove does not provide clearance for the screw head, so the screw is retained in the locking groove during all movement of the screw across the full length of main slab 212. Lower locking groove 215 may be used in conjunction with many types of commercially available clamping systems and/or individual clamps.

Two bench plate brackets 220 are used to support bench plate 210 with one bench plate bracket 220 positioned at each end of bench plate 210. Bench plate bracket 220 is a bracket used to rigidly attach paddle arm 230 to bench plate 210. Any type of bracket may be used for this connection.

In best mode, bench plate brackets are lockable to yield a reversible lockable rigid attachment between paddle arm 230 and bench plate 210. This allows bench plate 210 to be removed from the vehicle and hand carried to a remote work location. In best mode, each bench plate bracket 220 is a special jig or bracket assembly which functions to reversibly lockably mount paddle arm 230 to the lower surface of bench plate 210. Best mode bench plate bracket 220 comprises a horizontal rigid planar member with an upper surface, a lower surface, and a plurality of assembly screw holes there through used to attached the upper surface of horizontal rigid planar member to the lower surface of bench plate 210. Assembly screw holes may be tapped holes. Best mode bench plate bracket 220 further comprises a vertical rigid planar member that functions to reversibly lockably mount to the handle end of paddle arm 230. One end of vertical rigid planar member is rigidly attached to the lower surface of a horizontal rigid planar member, perpendicular thereto, to form a rigid T-shaped member that is the "T" shape of best mode bench plate bracket 220. Vertical rigid planar member there houses a locking pin 224 and a lock tumbler assembly 226 to form a locking mechanism actuated by a key 228 that functions to reversibly lock bench plate bracket 220 to paddle arm 230. The turning of key 228 when inserted into the lock tumbler assembly 226 causes movement of locking pin 224 thereby locking or releasing paddle arm 230 from vertical rigid planar member.

A paddle arm 230 is used to support each bench plate bracket 220. Each paddle arm 230 is a rigid planar member in the shape of a paddle, having a handle end and a paddle end. As state above, in best mode, the handle-end of paddle arm is reversibly lockably mounted to a bench plate bracket 220. The paddle end of paddle arm 230 further comprises an upper pushpin lock mounting hole 232, an upper pushpin lock 234, an upper axle bushing mounting hole 236, and an upper screw clamp clearance slot 238. Each upper pushpin lock 234 is a typical pushpin lock comprising a lock pin and a handle where a retainer on the tip of the lock pin retracts in response to the pushing of a button on the handle of the pushpin lock. Thus, the button is pushed to retract and relocate a pushpin lock and then the button is released to lock the pushpin lock in place. An upper pushpin lock 234 is mounted in the upper pushpin lock mounting hole 232 where upper pushpin lock 234 functions in tandem with upper pushpin lock clearance holes 242, 243 on main arm 240 to lock and hold paddle arm 230 relative to main arm 240 at certain rotational positions designated by the location of upper pushpin lock clearance holes 242, 243 on main arm 240. Upper axle bushing mounting hole 236 is a perpendicular cylindrical hole in the center of the paddle end of paddle arm 230 that functions to accept and mount an upper axle bushing 252 therein. Upper axle bushing 252 is rigidly mounted into upper axle bushing mounting hole 236.

A main arm 240 is used to support each paddle arm 230. Each main arm 240 is a rigid oblong planar member with an upper rounded end and a lower rounded end. Upper rounded end of main arm 240 further comprises an upper axle bushing mounting hole 241, an upper pushpin lock clearance hole collapsed position 242, an upper pushpin lock clearance hole work position 243, an upper screw clamp mounting hole 244, and an upper screw clamp 245. Upper axle mounting bushing mounting hole 241 is a perpendicular cylindrical hole in the center of the upper rounded end of main arm 240 that functions to accept and mount an upper axle bushing 252 therein. Upper axle bushing 252 is rigidly mounted into upper axle bushing mounting hole 241. Upper pushpin lock clearance hole collapsed position 242 and upper pushpin lock clearance hole work position 243 are each a perpendicular cylindrical hole in the upper rounded end of main arm 240 sized to yield a clearance fit with the lock pin of upper pushpin lock 234 with its button depressed and a interference fit with the lock pin of upper pushpin lock 234 with its button released. Upper pushpin lock clearance hole collapsed position 242 is located on main arm 240 at the rotation position of upper pushpin lock 234 when bench plate 210 is in the flat or collapsed position that is best for travel as described below. Upper pushpin lock clearance hole work position 243 is located on main arm 240 at the rotation position of upper pushpin lock 234 when bench plate 210 is in the angled or work position that is best for working as described below.

The upper rounded end of each main arm 240 is pivotally attached to the paddle end of each paddle arm 230. Pivotal attachment may be accomplished with any known means. In best mode, pivotal attachment is done with at least one upper axle 251 and four upper axle bushings 252. Upper axle 251 is a rigid cylindrical member that is an axle. Each upper axle bushing 252 is a typical bushing with an inner and outer diameter that are each capable of appreciably unhindered rotational motion relative to each other. Inner diameter of each upper axle bushing 252 is sized to make a press fit into the outer diameter of upper axle 251. Outer diameter of each upper axle bushing 252 is sized to make a press fit into the inner diameter of upper axle bushing mounting hole 236 and upper axle bushing mounting hole 241. Thus upper axle bushing mounting hole 236 and upper axle bushing mounting hole 241 are equivalently sized. With all four upper axle bushings 252 installed and held concentric with each other, upper axle 251 is pressed through the inner diameters of all four upper axle bushing 252 to pivotally attach the upper rounded end of each main arm 240 to the paddle end of each paddle arm 230 as depicted.

This pivotal attachment may further comprise a means to hold paddle arms 230 and main arms 240 in their correct positions on upper axle 251 to facilitate clearance for unhindered rotation between these members when upper screw clamps 245 are loosened and to facilitate firm clamping action between these members when upper screw clamps 245 are tightened. A plurality of collar locks 255 may be used to accomplish this where a collar lock 255 is mounted on upper axle 251 adjacent to each side of each pivotal attachment between paddle arm 230 and upper rounded end of main arm 240 to retain each paddle arm 230 at a maximum distance from each upper rounded end of main arm 240. A collar lock 255 is an annulus shaped member that is capable of sliding over an axle at its inner diameter and capable of locking onto the axle in response to an actuation and releasing upon another actuation. Other than the use of collar locks 255, any known means may be used to retain paddle arms 230 and main arms 240 in their correct positions on upper axle 251.

Each upper screw clamp 245 is a typical screw clamp with a threaded screw end and a large head that may be rotated by hand. The width of upper screw clamp clearance slot 238 is sized above the outer diameter of threaded screw end of upper screw clamp 245 so that the threaded screw end has clearance to move within the clearance slot. However, the width of upper screw clamp clearance slot 238 is too narrow to allow passage of the large head of upper screw clamp 245. The threaded screw end of upper screw clamp 245 is passed through upper screw clamp clearance slot 238 with a clearance fit and threaded into upper screw clamp mounting hole 244. Upper screw clamp mounting hole 244 is a tapped hole in upper rounded end of main arm 240. The clearance between upper screw clamp 245 and upper screw clamp clearance slot 238 and threaded arrangement between upper screw clamp 245 and upper screw clamp mounting hole 244 is such that the clockwise rotation of the large head on upper screw clamp 245 draws the upper rounded end of main arm 240 towards the large head of upper screw clamp 245 thereby clamping paddle arm 230 there in between and the counter-clockwise rotation of the large head on upper screw clamp 245 separates the upper rounded end of main arm 240 from the large head of upper screw clamp 245 thereby releasing upper screw clamp clearance slot 238 to allow clearance and unrestrained rotational motion between paddle arm 230 and main arm 240 about the longitudinal axis of upper axle 251.

Figure 2:
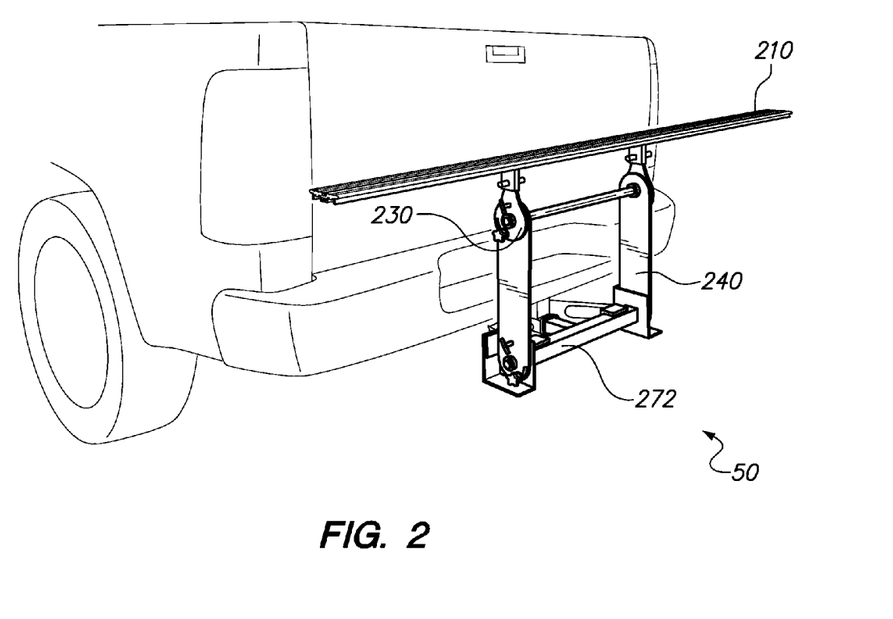
FIG. 2 is a perspective view of trailer hitch receiver mounted collapsible workbench mounted to the trailer hitch receiver on a pickup truck with the trailer hitch receiver mounted collapsible workbench in the flat or collapsed position.

This pivotal rotation is required for the collapsible aspect of the invention to yield a flat position for travelling and an angled position for working. The flat position is best for travelling because in this position the trailer hitch receiver mounted collapsible workbench 50 is tucked neatly against the rear or tail gate of the vehicle thereby minimizing the amount with which the trailer hitch receiver mounted collapsible workbench 50 sticks out or extends from the rear of the vehicle. The angled position is best for working because in this position the trailer hitch receiver mounted collapsible workbench 50 extends farther from the rear or tailgate of the vehicle to provide more work space behind and underneath bench plate 210 for working and because in this position bench plate 210 is lower and at the most comfortable level for working.

T-Bar assembly 270 comprises a T-Frame 272 and two ear plates 273. T-Frame 272 is a rigid and sturdy tubular frame member in the shape of a "T" with a base vertical member perpendicular to and attached to an upper horizontal member. The base vertical member of T-Frame 272 is inserted and mounted inside trailer hitch receiver 111. The outer dimensions of base vertical member of T-Frame must be sized to form a clearance fit inside trailer hitch receiver 111. Since trailer hitch receiver 111, by convention, is a rectangular tubular frame member, with a rectangular cuboid-shaped receiver, base vertical member of T-Frame 272 is also a rectangular tubular frame member. A rectangular cuboid-shaped exterior helps form a more stable stackable fit between these members. In best mode, as depicted, upper horizontal member of T-Frame 272 is also rectangular cuboid-shaped because generally it is easier to attach similarly shaped members together to form the "T" shape however upper horizontal member may be of any geometric shape such as cylindrical, square or triangular cuboid.

Base vertical member of T-Frame is reversibly mounted in a standard trailer hitch receiver 111 in the same way that a standard hitch ball mount or a standard hitch ball tongue is reversibly mounted to any standard trailer hitch receiver 111. There is a lock pin clearance hole 272A in base member of T-Frame that is a cylindrical void running perpendicular to the surface of base member of T-Frame and parallel to the upper horizontal member of T-Frame 272. Lock pin clearance hole 272A provides clearance to receive a hitch pin or a hitch lock pin. Base member of T-Frame 272 is held inside trailer hitch receiver 111 with a hitch pin (not depicted) or alternatively locked inside trailer hitch receiver 111 with hitch lock pin (not depicted).

Each ear plate 273 is a rigid vertical planar member with an inner surface and an outer surface. The inner surface of each ear plate 273 is rigidly attached to an end of the upper horizontal member of T-Frame 272 so that the plane of each ear plate 273 is perpendicular to the longitudinal axis of the upper horizontal member of T-Frame 272. Attachment occurs by welding, soldering, gluing, bolting, or screwing. As depicted in the drawings, each ear plate 273 has there attached two additional plates (not numbered). These plates are added in best mode but not required. These plates are added as rock shields to shield and protect lower pushpin lock 248 and lower screw clamp 278 from damage resulting from rocks or other debris being kicked up from the road during vehicle travelling.

Each ear plate 273 further comprises a lower axle bushing mounting hole 274, a lower pushpin lock clearance hole collapsed position 275, a lower pushpin lock clearance hole work position 276, a lower screw clamp mounting hole 277, and a lower screw clamp 278. Lower axle bushing mounting hole 274 is a perpendicular cylindrical hole in the center of ear plate 273 that functions to accept and mount a lower axle bushing 254 therein. Lower axle bushing 254 is rigidly mounted into lower axle bushing mounting hole 274. Lower pushpin lock clearance hole collapsed position 275 and lower pushpin lock clearance hole work position 276 are each a perpendicular cylindrical hole in ear plate 273 sized to yield a clearance fit with the lock pin of lower pushpin lock 248 with its button depressed and a interference fit with the lock pin of lower pushpin lock 248 with its button released. Lower pushpin lock clearance hole collapsed position 275 is located on ear plate 273 at the rotation position of lower pushpin lock 248 when bench plate 210 is in the flat or collapsed position that is best for travel as described below. Lower pushpin lock clearance hole work position 276 is located on ear plate 273 at the rotation position of lower pushpin lock 248 when bench plate 210 is in the angled or work position that is best for working as described below. An ear plate 273 is used to support each lower rounded end of each main arm 240.

Each lower rounded end of each main arm 240 further comprises a lower axle bushing mounting hole 246, a lower pushpin lock mounting hole 247, a lower pushpin lock 248, and a lower screw clamp clearance slot 249. Each lower pushpin lock 248 is a typical pushpin lock comprising a lock pin and a handle where a retainer on the tip of the lock pin retracts in response to the pushing of a button on the handle of the pushpin lock. Thus, the button is pushed to retract and relocate a pushpin lock and then the button is released to lock the pushpin lock in place. A lower pushpin lock 248 is mounted in the lower pushpin lock mounting hole 246 where lower pushpin lock 228 functions in tandem with lower pushpin lock clearance holes 275, 276 on ear plate 273 to lock and hold main arm 240 relative to ear plate 273 at a certain rotational positions designated by the location of lower pushpin lock clearance holes 275, 276 on ear plate 273. Lower axle bushing mounting hole 274 is a perpendicular cylindrical hole in the center of the lower rounded end of main arm 240 that functions to accept and mount a lower axle bushing 254 therein. Lower axle bushing 254 is rigidly mounted into lower axle bushing mounting hole 274.

The lower rounded end of each main arm 240 is pivotally attached to an ear plate 273. Pivotal attachment may be accomplished with any known means. In best mode, pivotal attachment is done with at least one lower axle 253 and four lower axle bushings 254. Lower axle 253 is a rigid cylindrical member that is an axle. Each lower axle bushing 254 is a typical bushing with an inner and outer diameter that are each capable of appreciably unhindered rotational motion relative to the other. Inner diameter of each lower axle bushing 254 is sized to make a press fit into the outer diameter of lower axle 253. Outer diameter of each lower axle bushing 254 is sized to make a press fit into the inner diameter of upper axle bushing mounting hole 236 and upper axle bushing mounting hole 241. Thus lower axle bushing mounting hole 226 and lower axle bushing mounting hole 274 are equivalently sized. With all four lower axle bushings 254 installed and held concentric with each other, lower axle 253 is pressed through the inner diameters of all four lower axle bushing 254 to pivotally attach the lower rounded end of each main arm 240 to ear plate 273 as depicted. Lower axle 253 runs through the center or longitudinal axis of upper horizontal member of T-Frame 272 as depicted.

This pivotal attachment may further comprise a means to hold the lower rounded ends of main arms 240 in their correct positions on lower axle 253 to facilitate clearance for unhindered rotation between the lower rounded ends of main arms 240 and ear plates 273 when lower screw clamps 278 are loosened and to facilitate firm clamping action between these members when lower screw clamps 278 are tightened. A plurality of collar locks 255 may be used to accomplish this where a collar lock 255 is mounted on lower axle 253 adjacent to each side of each pivotal attachment of ear plate 273 to lower rounded end of main arm 240 to retain each lower rounded end of main arm 240 at a maximum distance from each ear plate 273. Other than the use of collar locks 255, any known means may be used to retain paddle arms 230 and main arms 240 in their correct positions on upper axle 251.

Each lower screw clamp 278 is a typical screw clamp with a threaded screw end and a large head that may be rotated by hand. The width of lower screw clamp clearance slot 249 is sized above the outer diameter of threaded screw end of lower screw clamp 278 so that the threaded screw end has clearance to move within the clearance slot. However, the width of lower screw clamp clearance slot 249 is too narrow to allow passage of the large head of lower screw clamp 278. The threaded screw end of lower screw clamp 278 is passed through lower screw clamp clearance slot 249 with a clearance fit and threaded into lower screw clamp mounting hole 277. Lower screw clamp mounting hole 277 is a tapped hole in ear plate 273. The clearance between lower screw clamp 278 and lower screw clamp clearance slot 249 and threaded arrangement between lower screw clamp 278 and lower screw clamp mounting hole 277 is such that the clockwise rotation of the large head on lower screw clamp 278 draws the large head of lower screw clamp 278 towards ear plate 273 thereby clamping lower rounded end of main arm 240 there in between and the counterclockwise rotation of the large head on lower screw clamp 278 separates the large head on lower screw clamp 278 from ear plate 273 thereby releasing lower screw clamp clearance slot 249 to allow clearance and unrestrained rotational motion between lower rounded end of main arm 240 and ear plate 273 about the longitudinal axis of lower axle 253.

To change trailer hitch receiver mounted collapsible workbench 50 from flat or collapsed position to angled or work position, first the lower rounded ends of each main arm 240 are rotated from collapsed position to work position. Then, each paddle arm 230 is rotated from collapsed position to work position to place bench plate 210 in the work position. This occurs as follows.

The lower rounded end of each main arm 240 is released by rotating each lower screw clamp 278 counterclockwise to unclamp each lower rounded end of each main arm 240. Then, the button on each lower pushpin lock 248 is depressed to remove each lower pushpin lock 248 from a lower pushpin lock clearance hole collapsed position 275 to allow the free rotation of each lower rounded end of each main arm 240 relative to each adjacent ear plate 273 to the rotational position or angle where each lower pushpin lock 248 may be inserted into an a lower pushpin lock clearance hole work position 276 and the button on each lower pushpin lock 248 is then released to lock each lower rounded end of each main arm 240 into the angled or work position. Then, lower rounded end of each main arm 240 is firmly clamped into this position by rotating each lower screw clamp 278 clockwise to clamp each lower rounded end of each main arm 240 as described above.

Next, each paddle arm 230 is released by rotating each upper screw clamp 245 counterclockwise to unclamp each paddle arm 230. Then, the button on each upper pushpin lock 234 is depressed to remove each upper pushpin lock 234 from an upper pushpin lock clearance hole work position 243 to allow the free rotation of each paddle arm 230 relative to each main arm 240 to the rotational position or angle where each upper pushpin lock 234 may be inserted into an upper pushpin lock clearance hole collapsed position 242 and the button on each upper pushpin lock 234 is then released to lock each paddle arm 230 into the flat or collapsed position. Then, each paddle arm 230 is firmly clamped into this position by rotating each upper screw clamp 245 clockwise to clamp each paddle arm 230 as described above.

To change trailer hitch receiver mounted collapsible workbench 50 from angled or work position to flat or collapsed position, each paddle arm 230 is first rotated from work position to collapsed position. Then, each lower rounded end of each main arm 240 is rotated from work position to collapsed position to place bench plate 210 in the collapsed position. This occurs as follows.

Each paddle arm 230 is released by rotating each upper screw clamp 245 counterclockwise to unclamp each paddle arm 230. Then, the button on each upper pushpin lock 234 is depressed to remove each upper pushpin lock 234 from an upper pushpin lock clearance hole collapsed position 242 to allow the free rotation of each paddle arm 230 relative to each main arm 240 to the rotational position or angle where each upper pushpin lock 234 may be inserted into an upper pushpin lock clearance hole work position 243 and the button on each upper pushpin lock 234 is then released to lock each paddle arm 230 into the angled or work position. Then, each paddle arm 230 is firmly clamped into this position by rotating each upper screw clamp 245 clockwise to clamp each paddle arm 230 as described above.

Next, the lower rounded end of each main arm 240 is released by rotating each lower screw clamp 278 counterclockwise to unclamp each lower rounded end of each main arm 240. Then, the button on each lower pushpin lock 248 is depressed to remove each lower pushpin lock 248 from a lower pushpin lock clearance hole work position 276 to allow the free rotation of each lower rounded end of each main arm 240 relative to each adjacent ear plate 273 to the rotational position or angle where each lower pushpin lock 248 may be inserted into a lower pushpin lock clearance hole collapsed position 275 and the button on each lower pushpin lock 248 is then released to lock each lower rounded end of each main arm 240 into the flat or collapsed position. Then, each lower rounded end of each main arm 240 is firmly clamped into this position by rotating each lower screw clamp 278 clockwise to clamp each lower rounded end of each main arm 240 as described above.

Figure 9:
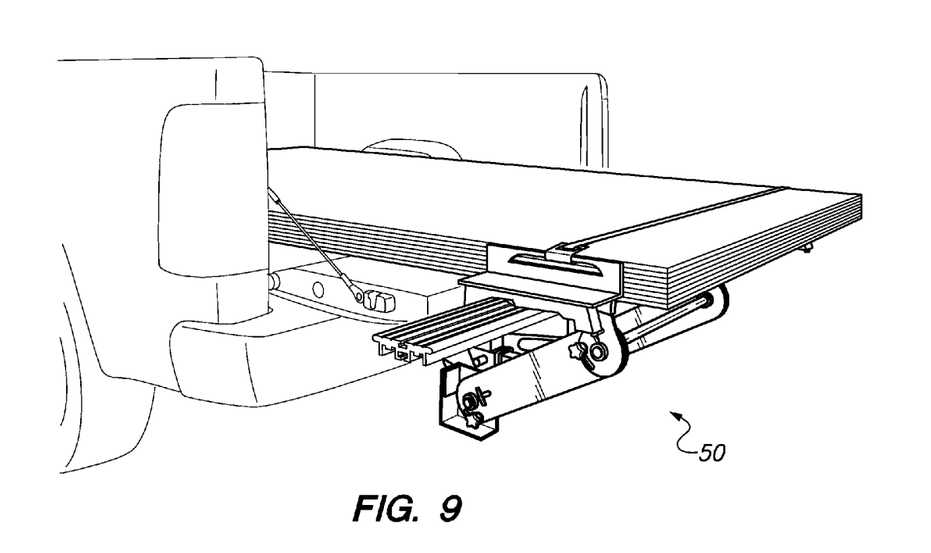
FIG. 9 is a perspective view of trailer hitch receiver mounted collapsible workbench mounted to a trailer hitch receiver on a pickup truck with the trailer hitch receiver mounted collapsible workbench in the angled or work position and the tailgate of the pickup truck lowered to yield an extended payload area or truck bed depicted with several sheets of plywood loaded therein and secured with two special slideable edge tie-down brackets and a strap.

The length of main arms 240 and the locations of pushpin lock clearance holes 243, 276 must be such that the upper surface of bench plate 210 is exactly level with that of the lowered tailgate of a pickup truck mounted thereto when the bench plate 210 is in the angled or work position. This design ensures that when the bench plate 210 is in the angled or work position and the tailgate of the pick up truck is lowered, bench plate 210 acts to extend the bed or cargo area of the pickup truck as depicted in FIG. 9. Thus, in addition to providing a workbench area for working and holding power tools and mechanical tools, trailer hitch receiver mounted collapsible workbench 50 also provides a truck bed extension platform.

Figure 8:
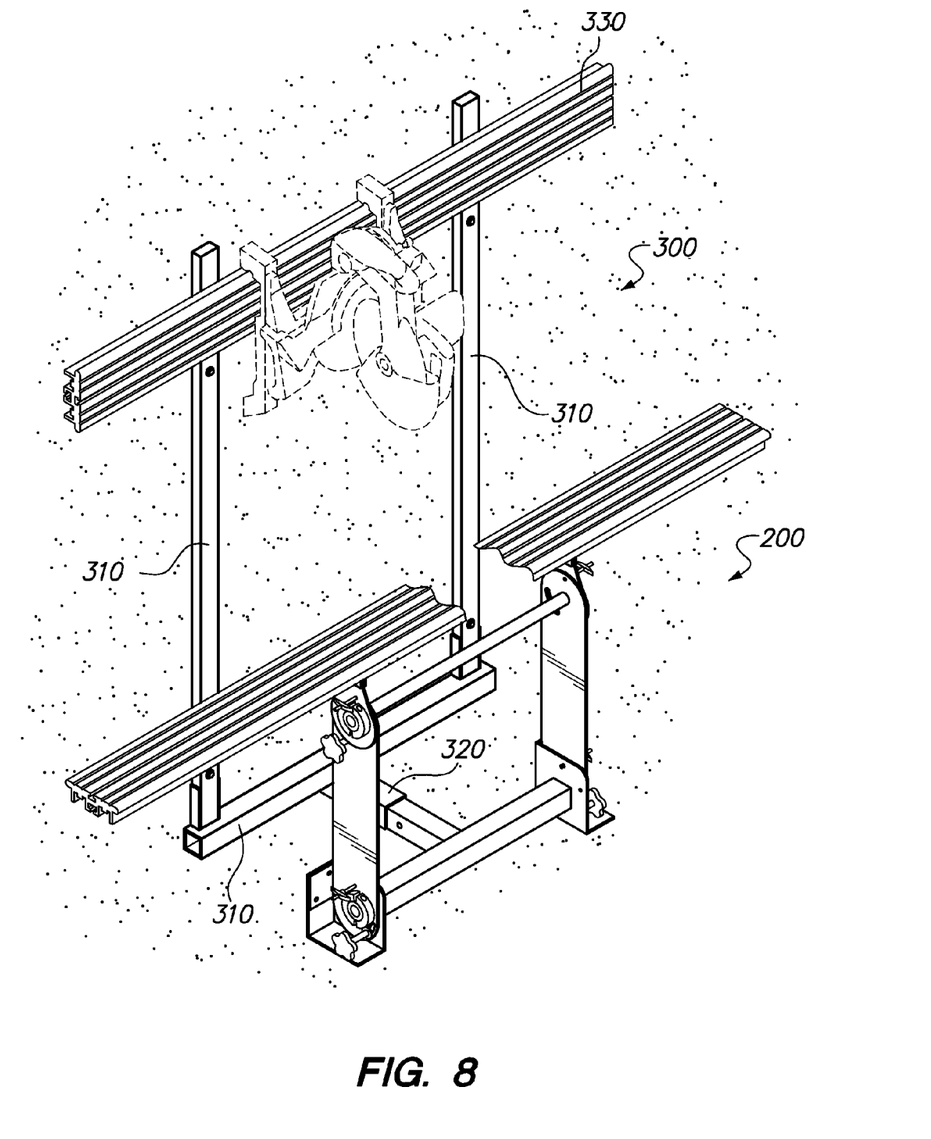

Trailer hitch receiver mounted collapsible workbench 50 may further comprise a wall mount assembly 300. Wall mount assembly 300 is a wall frame 310 with a wall receiver 320 there attached and a wall plate 330 there attached. Wall mount assembly 300 is a means to store the power tools, mechanical tools, and/or work objects fitted with the clamping systems and/or individual clamps described above on the wall of a work shop, garage, or similar building in which work is conducted. Wall frame 310 is a rigid planar frame structure or assembly of tubular frame pieces to form a planar structure. Wall frame 310 is capable of being securely attached to a wall of a building. Wall receiver 320 is rigid tubular frame that is sized exactly like a standard trailer hitch receiver of a vehicle. Wall receiver 320 is attached to wall frame 310, perpendicular to the plane of wall frame 310, as depicted in FIG. 8. Wall plate 330 is an object that is a duplicate of bench plate 210. Wall plate 330 is attached to wall frame 310 with is longitudinal axis horizontal and parallel to the plane of wall frame 310 as depicted. With wall mount assembly 300, any power tools, mechanical tools, and/or work objects fitted with the clamping systems and/or individual clamps described above may be very quickly transferred from the vehicle to the shop by simply unclamping them from the bench plate 210 on the vehicle and then reclamping them to the wall plate 330 in the shop, garage, or similar.

What is claimed is:

1. A trailer hitch receiver mounted collapsible workbench comprising:
    a stabilizer assembly, comprising a horseshoe plate, at least two support channels, and a trailer hitch receiver attachment means, wherein
        said horseshoe plate having a rigid horseshoe shaped member,
        each said support channel is a rigid three-sided trough or channel member with two open ends,
        each said support channels is rigidly attached to said horseshoe plate, and
        said trailer hitch receiver attachment means is a means to rigidly reversibly attach said stabilizer assembly to a trailer hitch receiver of a vehicle; and
    a collapsible workbench assembly, comprising a bench plate, at least two bench plate brackets, each with an upper end and a lower end, at least two paddle arms, each with an upper end and a lower end, at least two main arms, each with an upper end and a lower end, and a T-Bar assembly, wherein
        said bench plate is a rigid planar member with an upper surface, a lower surface, and four edges,
        each said upper end of each said bench plate bracket is rigidly attached to said lower surface of said bench plate,
        each said lower end of each said bench plate bracket is rigidly attached said upper end of each said paddle arm,
        each said lower end of each said paddle arm is pivotally attached to said upper end of each said main arm,
        each said lower end of each said main arm is pivotally attached to said T-Bar assembly, and
        said T-Bar assembly is reversibly mounted to the trailer hitch receiver of a vehicle.

2. A trailer hitch receiver mounted collapsible workbench as recited in claim 1 wherein at least one of said four edges of said bench plate is rounded to function as a track or a clamping edge for a clamp.

3. A trailer hitch receiver mounted collapsible workbench as recited in claim 2 wherein said upper surface of said bench plate further comprises a locking groove.

\* \* \* \* \*